(12) United States Patent
Chen et al.

(10) Patent No.: US 11,508,069 B2
(45) Date of Patent: Nov. 22, 2022

(54) METHOD FOR PROCESSING EVENT DATA FLOW AND COMPUTING DEVICE

(71) Applicant: OmniVision Sensor Solution (Shanghai) Co., Ltd, Shanghai (CN)

(72) Inventors: Shoushun Chen, Shanghai (CN); Shizheng Wang, Shanghai (CN)

(73) Assignee: CELEPIXEL TECHNOLOGY CO. LTD, Shanghai (CN)

(*) Notice: Subject to any disclaimer, the term of this patent is extended or adjusted under 35 U.S.C. 154(b) by 162 days.

(21) Appl. No.: 17/083,651

(22) Filed: Oct. 29, 2020

(65) Prior Publication Data

US 2021/0042931 A1    Feb. 11, 2021

Related U.S. Application Data

(63) Continuation of application No. PCT/CN2018/088258, filed on May 24, 2018.

(30) Foreign Application Priority Data

May 15, 2018   (CN) .......................... 201810464280.X

(51) Int. Cl.
| | | |
|---|---|---|
| G06T 7/90 | (2017.01) |
| G06T 7/10 | (2017.01) |
| G06F 9/30 | (2018.01) |
| G06F 9/38 | (2018.01) |
| G06T 7/20 | (2017.01) |

(52) U.S. Cl.
CPC .............. *G06T 7/10* (2017.01); *G06F 9/3005* (2013.01); *G06F 9/3836* (2013.01); *G06T 7/20* (2013.01); *G06T 7/90* (2017.01)

(58) Field of Classification Search
CPC ............................ G06T 7/20–292; G06T 5/90
See application file for complete search history.

(56) References Cited

U.S. PATENT DOCUMENTS

| | | | |
|---|---|---|---|
| 11,335,019 B2 * | 5/2022 | Sio-Hoi | ................... G06T 7/593 |
| 2016/0109955 A1* | 4/2016 | Park | .......................... G09G 5/00 |
| | | | 345/668 |
| 2016/0140731 A1* | 5/2016 | Lee | .......................... G06T 7/593 |
| | | | 382/107 |
| 2017/0032536 A1* | 2/2017 | Lee | ......................... H04N 7/183 |
| 2017/0053407 A1* | 2/2017 | Benosman | .............. G06T 7/246 |
| 2018/0063449 A1* | 3/2018 | Sio-Hoi | ............... G06K 9/0053 |
| 2018/0218203 A1* | 8/2018 | Lawson | .................... G06T 7/20 |
| 2020/0394418 A1* | 12/2020 | Liu | ....................... G06V 10/454 |

FOREIGN PATENT DOCUMENTS

| | | |
|---|---|---|
| CN | 107018357 A | 8/2017 |
| CN | 107403154 A | 11/2017 |

* cited by examiner

*Primary Examiner* — Sean T Motsinger
(74) *Attorney, Agent, or Firm* — IPro, PLLC; Na Xu

(57) ABSTRACT

The present disclosure provides a method for processing an event data flow and a computing device. The method includes: reading a plurality of pieces of event data with a first duration sequentially from the event data flow; with respect to each piece of event data with the first duration, analyzing the event data to acquire time-difference information about each event within the first duration; and generating an image frame presenting a change in movement within the first duration in accordance with the time-difference information about each event within the first duration.

8 Claims, 6 Drawing Sheets

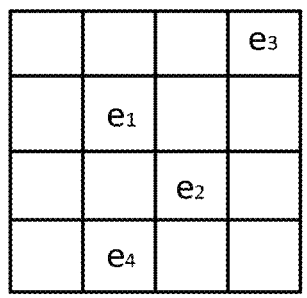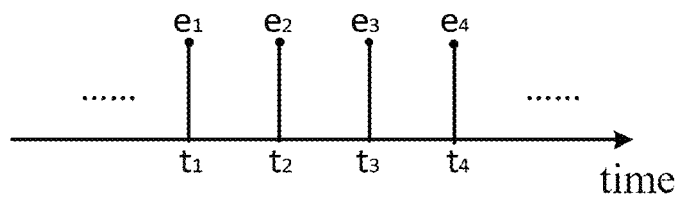
Fig. 2A
Fig. 2B (1)

(2)

(3)

(4)

METHOD FOR PROCESSING EVENT DATA FLOW AND COMPUTING DEVICE

CROSS-REFERENCE TO RELATED APPLICATION

This application claims a priority of the Chinese Patent Application No. 201810464280.X filed on May 15, 2018, which is incorporated herein by reference in its entirety.

TECHNICAL FIELD

The present disclosure relates to the field of data processing technology, in particular to a method for processing an event data flow and a computing device.

BACKGROUND

Real-time optical flow calculation always plays a very important role in the field of computer vision, e.g., optical flow-based segmentation, movement detection, and target tracking and obstacle avoidance for aircrafts and vehicles. In actual use, as an urgent need, it is required to increase a speed of the optical flow calculation while ensuring high accuracy, and an optical flow is a basic element which plays a decisive role, so many optical flow calculation methods have been presented. In a conventional optical flow calculation method, a large quantity of data is captured by a conventional image sensor and then processed, so redundancy data is generated by a static ground repeatedly. The reading and processing of a large quantity of redundancy data leads to a huge computational cost as well as a restriction on a processing speed.

In addition, an even-based motion sensor has exhibited a great potential on a real-time performance of the optical flow calculation. As compared with the conventional image sensor, the motion sensor is capable of responding to an event representing a relative brightness change asynchronously. Moreover, a flow of an asynchronous digital event is outputted by the motion sensor without any restrictions from an exposure time or a frame rate. The motion sensor may detect an object which moves rapidly and the movement of which used to be captured by an expensive high-speed camera at a frame rate of several thousand Hz, but the outputted redundancy data is reduced significantly. Hence, the event-based optical flow calculation method has been widely used with respect to the motion sensor.

Generally, the event-based optical flow calculation method may include an event-based Lucas-Kanade method and a local plane fitting method. In the event-based optical flow calculation method, as an important step, slop (or gradient) information is extracted on the basis of a pixel intensity in a local area. However, in a conventional Dynamic Vision Sensor (DVS) system, the event may report a pixel position merely in the absence of illumination. Hence, the intensity of each pixel may be simulated in accordance with the quantity of events accumulated within a short time period. In this simulation method, a relative intensity change, rather than a real-time intensity, is represented, so the calculation is not accurate. In addition, as another problem, when the object that moves rapidly is detected, the accuracy of the event-based optical flow calculation may be limited by event sparsity. During the operation of the conventional DVS, each pixel operates independently, and it is impossible for the event generated by an individual activated pixel to provide sufficient information for the optical flow calculation.

Based on the above, there is an urgent need to provide a new scheme for extracting movement slope information in accordance with the pixel intensity, so as to improve the speed of the optical flow calculation.

SUMMARY

An object of the present disclosure is to provide a method for processing an event data flow and a computing device, so as to solve or at least alleviate at least one of the above-mentioned problems.

In one aspect, the present disclosure provides in some embodiments a method for processing an event data flow from a DVS for recording pixel information about a specific event, including: reading a plurality of pieces of event data with a first duration sequentially from the event data flow; with respect to each piece of event data with the first duration, analyzing the event data to acquire time-difference information about each event within the first duration; and generating an image frame presenting a change in movement within the first duration in accordance with the time-difference information about each event within the first duration.

In a possible embodiment of the present disclosure, the specific event is an event where brightness of a pixel in the DVS has changed, and the acquired event data includes a coordinate position of each pixel whose brightness has changed within the first duration and a timestamp of each pixel whose brightness has changed.

In a possible embodiment of the present disclosure, the reading the plurality of pieces of event data with the first duration sequentially from the event data flow includes reading the plurality of pieces of event data with the first duration sequentially from the event data flow, adjacent pieces of event data with the first duration including a same piece of event data with a second duration.

In a possible embodiment of the present disclosure, the reading the plurality of pieces of event data with the first duration sequentially from the event data flow includes: when the brightness of one pixel within the first duration has changed for many times, providing a plurality of timestamps corresponding to the coordinate position of the pixel in the read event data; and selecting a timestamp for the pixel whose brightness has changed recently from the plurality of timestamps as a timestamp corresponding to the coordinate position of the pixel.

In a possible embodiment of the present disclosure, the analyzing the event data to acquire the time-difference information about each event within the first duration includes: with respect to each piece of event data with the first duration, recording a start time point and/or an end time point of the first duration; and calculating the time-difference information about each event within the first duration in accordance with the start time point and/or the end time point, and the timestamp of each event in the event data.

In a possible embodiment of the present disclosure, the generating the image frame representing the change in the movement within the first duration in accordance with the time-difference information about each event within the first duration includes: calculating a pixel value corresponding to each event in accordance with the time-difference information about the event; and generating the image frame in accordance with the pixel values corresponding to all the events within the first duration and the coordinate positions, so as to represent the change in the movement within the first duration.

In a possible embodiment of the present disclosure, the calculating the time-difference information about each event within the first duration in accordance with the start time point and/or the end time point and the timestamp of each event in the event data includes calculating a difference between the end time point of the first duration and the timestamp of each event, to acquire the time-difference information about each event.

In a possible embodiment of the present disclosure, the calculating the time-difference information about each event within the first duration in accordance with the start time point and/or the end time point and the timestamp of each event in the event data includes calculating a difference between the timestamp of each pixel within the first duration and the start time point, to acquire the time-difference information about each event.

In a possible embodiment of the present disclosure, the calculating the pixel value corresponding to each event in accordance with the time-difference information about each event further includes performing a pre-processing operation on the time-difference information about each event to acquire processed time-difference information about each event; and calculating the pixel value corresponding to each event in accordance with the processed time-difference information about each event.

In a possible embodiment of the present disclosure, the pre-processing operation includes mapping the time-difference information about each event within the first duration to a predetermined range.

In a possible embodiment of the present disclosure, a pixel value $pixel_i$ corresponding to an event i is calculated through the following formula $$pixel_i = \frac{1}{\Delta t_i},$$

where $\Delta t_i$ represents the processed time-difference information about the event i.

In a possible embodiment of the present disclosure, a pixel value $pixel_i$ corresponding to an event i is calculated through the following formula $pixel_i = A - \Delta t_i$, where $\Delta t_i$ represents the processed time-difference information about the event i and A is a constant.

In a possible embodiment of the present disclosure, the generating the image frame in accordance with the pixel value corresponding to each event within the first duration and the coordinate position includes: creating an image with a predetermined size and initializing the image as an initial image frame; searching a pixel coordinate position corresponding to each event within the first duration from the initial image frame; and taking a pixel value corresponding to each event within the first duration as a pixel value for the pixel coordinate position corresponding to the event in the initial image, to acquire the image frame.

In another aspect, the present disclosure provides in some embodiments a computing device, including one or more processors, a memory, and one or more programs stored in the memory and executed by the one or more processors. The one or more programs include instructions for implementing the above-mentioned method.

In yet another aspect, the present disclosure provides in some embodiments a computer-readable storage medium storing therein one or more programs including instructions. The instructions are executed by a computing device so as to implement the above-mentioned method.

According to the event data flow processing scheme in the embodiments of the present disclosure, with respect to events triggered within a certain time period, the time-difference information about each event may be analyzed in accordance with the timestamp corresponding to each event, the pixel value corresponding to each event may be calculated in accordance with the time-difference information, and then the image frame may be generated to represent the change in the movement within the time period. As a result, it is able to represent movement information in a scene intuitively in accordance with the image frame. In addition, it is able to facilitate the subsequent movement analysis and calculation, thereby to increase a speed of the optical flow calculation.

Especially, within a certain time period, the earlier the event is triggered, the larger the pixel value corresponding to the event in the image frame. As a result, it is able to analyze the current movement information about an object moving in the scene and a movement trajectory thereof in accordance with the pixel values in the generated image frame, thereby to increase the speed of the optical flow calculation.

BRIEF DESCRIPTION OF THE DRAWINGS

In order to achieve the above and related objects, some descriptive aspects will be described in conjunction with the following description and drawings, and these aspects indicate various ways capable of practicing a principle of the present disclosure. All aspects and equivalent aspects thereof shall fall within the scope of the present disclosure. The above and other objects, features and advantages will become more apparent on the basis of the drawings in conjunction with the following description. Same reference signs represent a same component or element.

FIGS. 2A and 2B are schematic views showing the output of event data flows from a DVS according to one embodiment of the present disclosure;

DETAILED DESCRIPTION

The present disclosure will be described hereinafter in more details in conjunction with the drawings and embodiments. The following embodiments are for illustrative purposes only, but shall not be used to limit the scope of the present disclosure. In contrast, the following embodiments are provided so as to facilitate the understanding of the present disclosure.

Figure 1:
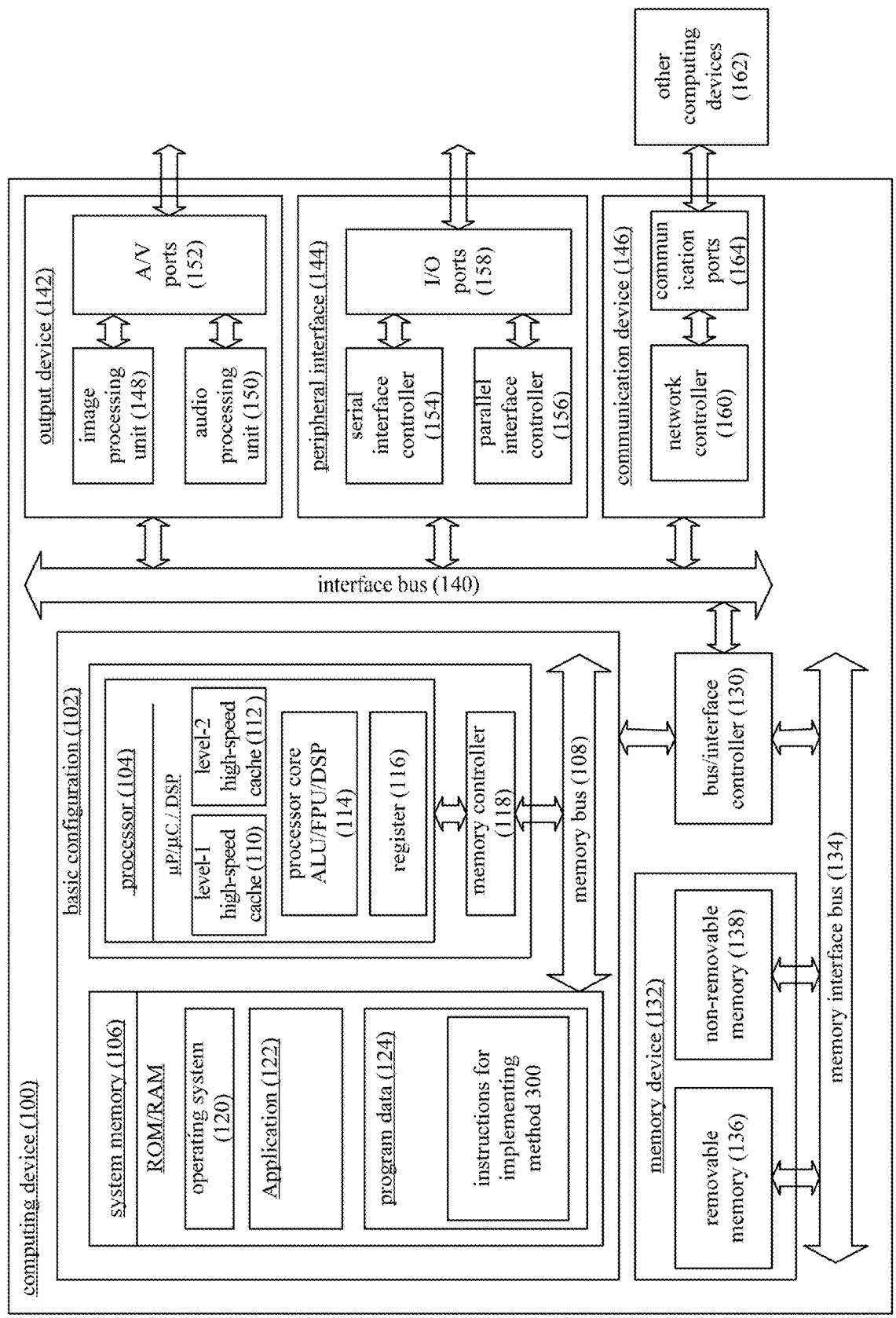
FIG. 1 is a schematic view showing a computing device 100 according to one embodiment of the present disclosure.

FIG. 1 is a block diagram of a computing device 100. In a basic configuration 102, the computing device 100 typically includes a system memory 106 and one or more processors 104. A memory bus 108 may be used for the communication between the processor 104 and the system memory 106.

Depending on a desired configuration, the processor 104 may be of any type, and it may include, but not limited to, microprocessor (µP), microcontroller (µC), Digital Signal Processor (DSP), or a combination thereof. The processor 140 may include one or more levels of high-speed caches (e.g., a level-1 high-speed cache 110 and a level-2 high-speed cache 112), a processor core 114 and a register 116. The processor core 114 may include an Arithmetic Logical Unit (ALU), a Float Point Unit (FPU), a DSP core, or a combination thereof. A memory controller 118 may be used together with the processor 104, or in some embodiments of the present disclosure, the memory controller 118 may be an internal component of the processor 104.

Depending on a desired configuration, the system memory 106 may be of any type, and it may include, but not limited to, volatile memory (e.g., Random Access Memory (RAM)), non-volatile memory (e.g., Read Only Memory (ROM) or flash memory), or a combination thereof. The system memory 106 may include an operating system 120, one or more applications 122, and a program data 124. In some embodiments of the present disclosure, the application 122 may be operated using the program data 124 on the operating system. In some embodiments of the present disclosure, the computing device 100 is configured to execute a method 300 for processing an event data flow, and the program data 124 may include instructions for implementing the method 300.

The computing device 100 may further include an interface bus 140 for the communication between various interface devices (e.g., an output device 142, a peripheral interface 144 and a communication device 146) and the basic configuration 102 via a bus/interface controller 130. The output device 142 may include a graphical processing unit 148 and an audio processing unit 150, which are configured to facilitate the communication with various external devices, e.g., display and loudspeaker, via one or more A/V ports 152. The peripheral interface 144 may include a serial interface controller 154 and a parallel interface controller 156, which are configured to facilitate the communication with the external devices, such as input devices (e.g., keyboard, mouse, pen, voice input device and image input device) or the other devices (e.g., printer or scanner) via one or more I/O ports 158. The communication device 146 may include a network controller 160, which is configured to communicate with one or more other computing devices 162 using a network communication link via one or more communication ports 164.

The network communication link may be an instance of a communication medium. Usually, the communication medium may be embodied as a computer-readable instruction, data structure or program module in a modulated data signal such as carrier or the other transmission mechanism, and it may include any information delivery medium. For the so-called modulated data signal, one or more data sets of the modulated data signal or the modulated data signal itself may be changed through encoding information in a signal. As a non-restrictive example, the communication medium may include a wired medium (e.g., wired network or private wire network), or a wireless medium (e.g., sound, Radio Frequency (RF), microwave, infrared (IR) or the like). The term "computer-readable medium" may include both the memory medium and the communication medium.

The computing device 100 may be a personal computer, e.g., desk-top computer or laptop computer. Of course, the computing device 100 may also be a part of a small-size portable (or mobile) electronic device, e.g., cellular phone, digital camera, PDA, Personal Media Player, wireless network browser, heat-mounted device, application-specific device, or a device including the above functions, which will not be particularly defined herein.

In the optical flow calculation, usually a conventional image sensor is replaced with a motion sensor. The motion sensor is capable of responding to an event representing a relative brightness change, so data outputted by the motion sensor may be used to record and exhibit movement information in a better manner than the conventional image sensor. In one implementation mode, a dynamic vision sensor (event camera) may be arranged in a scene, and when no object moves in the scene, the dynamic vision sensor does not display any content. However, once the movement of the object in the scene has been detected (i.e., there is a light change), an event data flow for dynamic pixels (i.e., pixels whose brightness has changed) may be outputted. In other words, the event data flow has recorded pixel information about the specific event (i.e., the pixels in the DVS whose brightness has changed).

FIGS. 2A and 2B are schematic views showing the output of the event data flows from the DVS. In FIG. 2A, a matrix having a size of 4*4 represents a pixel array in the DVS (it should be appreciated that, the matrix in FIG. 2A is for illustrative purpose only, and in actual use, the pixel array in the DVS is far greater than the size in FIG. 2A). When brightness of a certain pixel in the array has changed, corresponding event data $e_i$ (i=1, 2, 3, . . . ) may be triggered to be generated. As shown in FIG. 2B, with the elapse of time, the DVS may output the event data $e_1$, $e_2$, $e_3$, $e_4$, . . . sequentially, so as to form an event data flow. Each event data $e_i$ may include a coordinate position of a pixel whose brightness has changed and a timestamp thereof, i.e., the event data $e_i$ may be represented as $e_i=(x_i,y_i,t_i)$, where $(x_i, y_i)$ represents a coordinate position of an $i^{th}$ event, i.e., the coordinate position of the pixel whose brightness has changed, and $t_i$ represents a timestamp of the $i^{th}$ event, i.e., the timestamp of the pixel whose brightness has changed. As shown in FIG. 2A, a pixel coordinate position corresponding to the event data $e_1$ is (1,1), a pixel coordinate position corresponding to the event data $e_2$ is (2,2), a pixel coordinate position corresponding to the event data $e_3$ is (0,3), and a pixel coordinate position corresponding to the event data $e_4$ is (3,1). A timestamp of an event triggered later may be greater than a timestamp of an event triggered previously, e.g., $t_4>t_3>t_2>t_1$.

According to the method 300 in the embodiments of the present disclosure, the event data flow from the DVS may be processed to generate the image frames for representing changes in movement within a predetermined time period. As a result, it is able to analyze the movement of an object in a scene subsequently in accordance with the image frames, thereby to increase a speed of the optical flow calculation.

Figure 3:
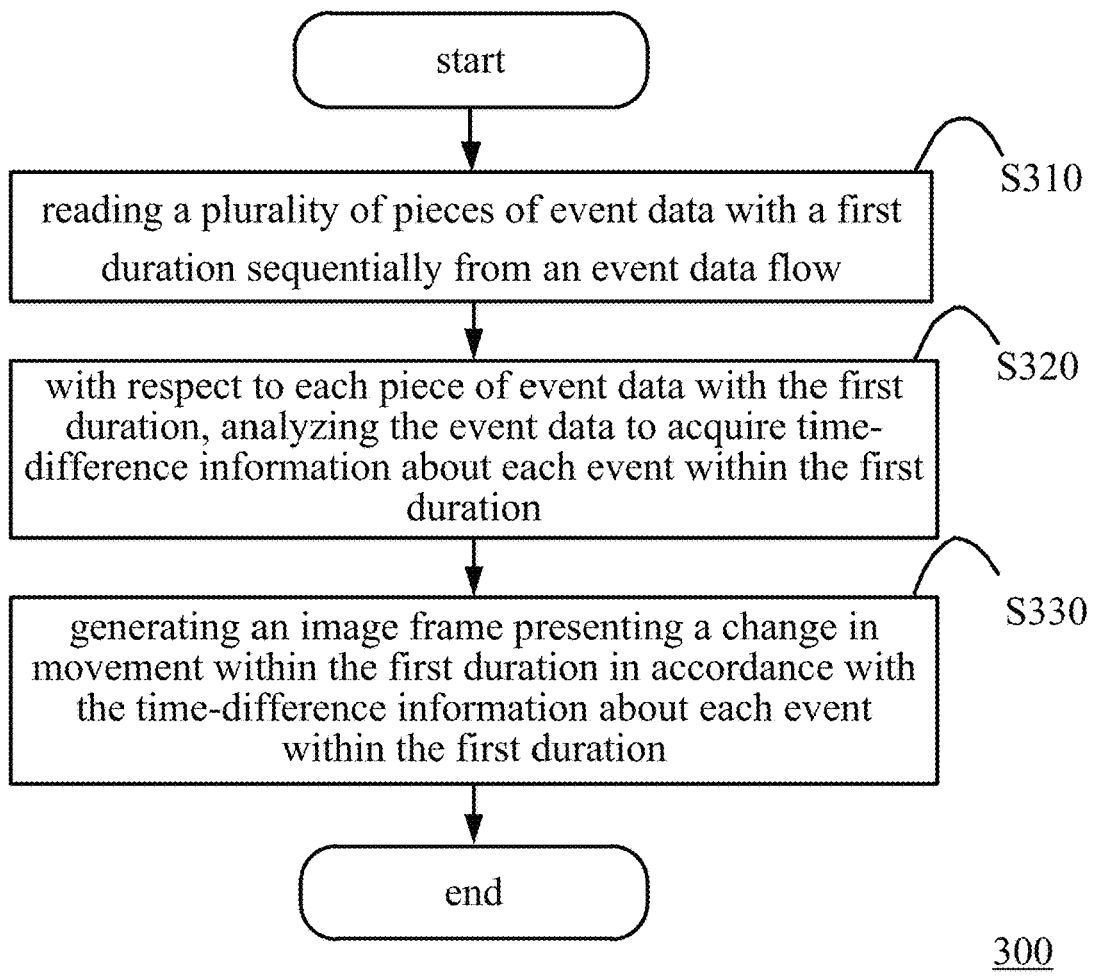
FIG. 3 is a flow chart of a method 300 for processing an event data flow according to one embodiment of the present disclosure.

FIG. 3 is a flow chart of the method 300 for processing an event data flow according to one embodiment of the present disclosure. As shown in FIG. 3, the method 300 includes the following steps.

Step S310: reading a plurality of pieces of event data with a first duration sequentially from the event data flow. As mentioned hereinabove, in the embodiments of the present disclosure, the specific event recorded in the event data flow is an event where brightness of a pixel in the DVS has changed, and the vent data includes a coordinate position of each pixel whose brightness has changed within the first duration and a timestamp thereof. In the embodiments of the present disclosure, a format of the event data with the first duration may be $(x_1,y_1,t_1),(x_2,y_2,t_2),(x_3,y_3,t_3),(x_4,y_4,t_4), \ldots$.

Figure 4:
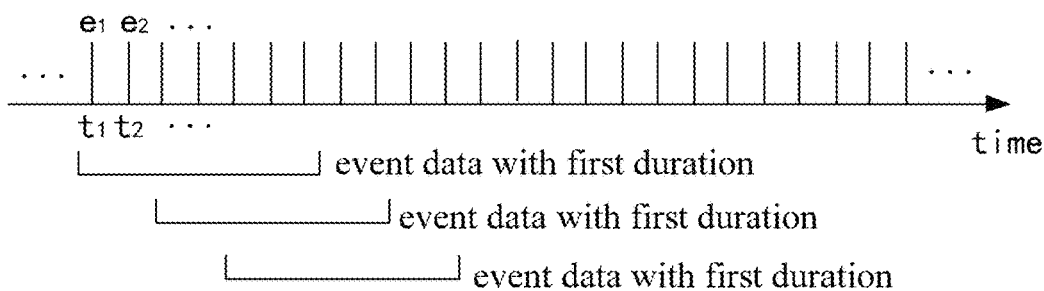
FIG. 4 is a schematic view showing the reading of a plurality of pieces of event data with a first duration according to one embodiment of the present disclosure.

In the embodiments of the present disclosure, the plurality of pieces of event data with the first duration may be acquired as follows. The plurality of pieces of event data with the first duration may be read sequentially from the event data flow, adjacent pieces of event data with the first duration may include a piece of event data with a second duration, and the first duration may be not greater than twice of the second duration. FIG. 4 shows the reading of the event data with the first duration from the event data flow. As shown in FIG. 4, events $e_1$, $e_2$, . . . are generated continuously over time, and $t_1$, $t_2$, . . . are timestamps corresponding to the events $e_1$, $e_2$, . . . . In the generated event data with the first duration, the adjacent pieces of event data with the first duration may overlap each other, and an overlapping ratio will not be particularly defined herein. In other words, the pieces of the event data with the first duration may be read sequentially from the event data flow at a predetermined interval, and the predetermined interval may be a difference between the first duration and the second duration. In the embodiments of the present disclosure, the predetermined interval may be 40 ms, the first duration may be 200 ms, and the second duration may be 160 ms. However, the specific values of the interval or duration will not be particularly defined herein.

Of course, the plurality of pieces of event data with the first duration may be acquired through a sliding window. The sliding window having a length equal to the first duration may be set, and it may slide in the event data flow at a sliding step of a third duration. Each time the sliding window slides, one piece of event data with the first duration may be acquired. In this regard, the adjacent two pieces of event data with the first duration may include a same piece of event data with the second duration. The second duration may be a value acquired through subtracting the sliding step from the length of the sliding window, i.e., subtracting the third duration from the first duration. In the embodiments of the present disclosure, a specific value of each duration will not be particularly defined, as long as the first duration is equal to a sum of the second duration and the third duration.

In addition, in a pixel array of the DVS, the brightness of a certain pixel may probably change many times, and one piece event data may be generated each time the brightness has changed. In this regard, in the event data flow, there may exist such a circumstance where two or more pieces of event data have a same coordinate position but have different timestamps. With respect to this circumstance, in some embodiments of the present disclosure, when the brightness of a certain pixel (with a coordinate position of (x, y)) in the pixel array of the sensor has changed many times within the first duration, the coordinate position (x, y) may correspond to a plurality of timestamps in the read event data with the first duration. At this time, a timestamp for the pixel whose brightness has changed recently may be selected from the plurality of timestamps as a timestamp corresponding to the coordinate position. In other words, a timestamp with a maximum value may be selected from the plurality of timestamps as the timestamp corresponding to the coordinate position. In a word, when two or more pieces of event data have the same coordinate position within the first duration, merely the recent event data may be reserved.

Step S320: with respect to each piece of event data with the first duration, analyzing the event data to acquire time-difference information about each event within the first duration.

In the embodiments of the present disclosure, the time-difference information about each event may be calculated through the following two steps.

In a first step, an end time point $T_d$ of the first duration may be recorded with respect to each piece of event data with the first duration. When event data for first 200 ms is read from the event data flow as a piece of event data with the first duration, the end time point of the first duration may be marked as $T_d$=200.

Figure 5:
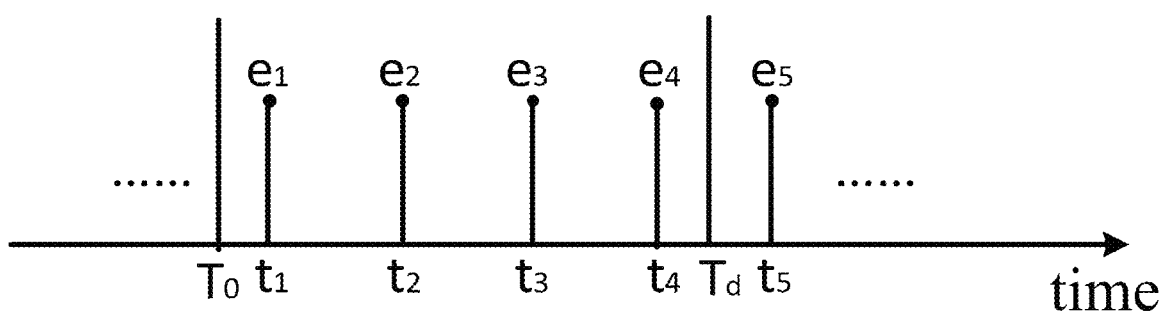
FIG. 5 is a schematic view showing a piece of event data with the first duration according to one embodiment of the present disclosure.

In a second step, the time-difference information about each event within the first duration may be calculated in accordance with the end time point and the timestamp of each event in the event data. FIG. 5 shows the event data with the first duration. A start time point of the first duration may be marked as $T_0$, and the end time point may be marked as $T_d$. There are four events between $T_0$ and $T_d$, the timestamps corresponding to the four events may be $t_1$, $t_2$, $t_3$, $t_4$, and the time-difference information about the four events may be $\Delta t_1'$, $\Delta t_2'$, $\Delta t_3'$, $\Delta t_4'$.

As mentioned hereinabove, a difference between the end time point $T_d$ of the first duration and the timestamp of each event within the first duration may be calculated so as to acquire the time-difference information about each event. Taking FIG. 5 as an example, for the time-difference information about the four events, $\Delta t_1'=T_d-t_1$, $\Delta t_2'=T_d-t_2$, $\Delta t_3'=T_d-t_3$, and $\Delta t_4'=T_d-t_4$.

As shown in FIG. 5, in the embodiments of the present disclosure, the closer the event is to a current time point, the smaller the corresponding time-difference information.

Step S330: generating an image frame presenting a change in movement within the first duration in accordance with the time-difference information about each event within the first duration.

In the embodiments of the present disclosure, Step S330 may include the following Step 1) and Step 2).

Step 1): calculating a pixel value corresponding to each event in accordance with the time-difference information about each event acquired in Step S320.

During the implementation, prior to calculating the pixel value corresponding to each event in accordance with the time-difference information about the event, a pre-processing operation needs to be performed on the time-difference information to acquire processed time-difference information, and then the pixel value corresponding to the event may be calculated in accordance with the processed time-difference information about each event. In a possible embodiment of the present disclosure, the pre-processing operation may include, e.g., mapping the time-difference information about each event within the first duration to a predetermined range. The event data flow is outputted at a scale of nanosecond, and when the time-difference information of a floating-point type is mapped to the predetermined range (an integer range), it is able to save memory and improve the subsequent calculation efficiency.

Usually, the predetermined range may be, but not limited to, 0 to 255. It should be appreciated that, the time-difference information may be mapped to any range, which will not be particularly defined herein.

In a possible embodiment of the present disclosure, with respect to each event, the time-difference information may be mapped to the predetermined range through the following formula $$\Delta t = \frac{\Delta t' - \min}{\max - \min} \times 255,$$

where $\Delta t'$ represents the time-difference information, $\Delta t$ represents the processed time-difference information, and max and min represent a maximum value and a minimum value of the time-difference information about all the events within the first duration respectively.

After the acquisition of the processed time-difference information about all the events, the pixel value corresponding to each event may be calculated in accordance with the processed time-difference information. In the embodiments of the present disclosure, a pixel value $pixel_i$ corresponding to an $i^{th}$ event may be calculated through the following formula $pixel_i = A - \Delta t_i$, where $\Delta t_i$ represents the processed time-difference information about the $i^{th}$ event, and A is a constant (in the embodiments of the present disclosure, A is 255; of course, A may be 100 or 200, which will not be particularly defined herein).

In other words, the closer the event is to the current time point, the larger the corresponding pixel value.

In another possible embodiment of the present disclosure, the predetermined range may be a range from 1 to any constant, or a range between any two non-zero values. Here, the predetermined range may be, but not limited to, 1 to 255. With respect to each event, the time-difference information may be mapped to the predetermined range through the following formula $$\Delta t = \frac{\Delta t' - \min}{\max - \min} \times 254 + 1,$$

where $\Delta t'$ represents the time-difference information, $\Delta t$ represents the processed time-difference information, and max and min represent a maximum value and a minimum value of the time-difference information about all the events within the first duration respectively.

After the acquisition of the processed time-difference information about all the events, the pixel value corresponding to each event may be calculated in accordance with the processed time-difference information. In the embodiments of the present disclosure, the pixel value $pixel_i$ corresponding to the $i^{th}$ event may be calculated through the following formula $$pixel_i = \frac{1}{\Delta t_i},$$

where $\Delta t_i$ represents the processed time-difference information about the $i^{th}$ event.

In other words, the closer the event is to the current time point, the larger the corresponding pixel value.

It should be appreciated that, the above two methods for calculating the pixel value in accordance with the time-difference information about each event are for illustrative purposes only, but shall not be used to limit the scope of the present disclosure. Various calculation methods may be adopted, as long as the pixel value corresponding to each event is acquired in accordance with the time-difference information in such a manner that the pixel corresponding to the event closer to the current time point has a larger value or a smaller value. Any methods for calculating the pixel value in accordance with the time-difference information about each event shall fall within the scope of the present disclosure.

Step 2): generating an image frame in accordance with the pixel value corresponding to each event within the first duration and a coordinate position thereof, the image frame representing change in movement within the first duration.

In the embodiments of the present disclosure, an image with a predetermined size may be created, and initialized as an initial image frame. The predetermined size may be a size of the pixel array in the DVS. An initial pixel value of each pixel point in the image may be 0, i.e., the pixel values in the initial image frame may be 0. Next, the coordinate position corresponding to each event within the first duration may be searched from the initial image frame. Then, the pixel value corresponding to each event within the first duration calculated in Step 1) may be taken as the pixel value of the pixel coordinate corresponding to the event in the initial image frame, so as to acquire the image frame. Table 1 shows a 3*3 pixel array, where $e_1$, $e_2$, $e_3$ represent the events triggered within a certain first duration, and positions of the events in Table 1 may be coordinate positions corresponding to the events. For example, the coordinate position corresponding to $e_1$ may be (1,0), the coordinate position corresponding to $e_2$ may be (2,1), and the coordinate position corresponding to $e_3$ may be (0,2). Table 2 shows the pixel values in the image frame generated in accordance with the events in Table 1. The pixel value corresponding to each event at the corresponding coordinate position may be calculated in accordance with the timestamp corresponding to the event (as mentioned hereinabove), and the pixel values at the other coordinate positions may be still 0.

TABLE 1

| Example of 3*3* pixel array | | |
|---|---|---|
| | | $e_3$ |
| $e_1$ | | |
| | $e_2$ | |

TABLE 2

| Example of pixel values in image frame | | |
|---|---|---|
| 0 | 0 | $pixel_3$ |
| $pixel_1$ | 0 | 0 |
| 0 | $pixel_2$ | 0 |

In a word, in the embodiments of the present disclosure, the pixel value corresponding to each event in the image frame may be inversely proportional to the corresponding time-difference information, and for the pixels in the DVS which have not been triggered, the pixel values in the image frame may be 0. In this regard, the earlier the triggered event within a certain time period, the larger the corresponding pixel value. Based on the pixel value in the generated image frame, it is able to intuitively reflect the change in the movement in a scene within the time period, and highlight current movement information about an object moving in the scene and a movement trajectory thereof, thereby to facilitate the subsequent optical flow analysis and calculation.

A process of calculating the time-difference information about each event has been illustratively described hereinabove in accordance with the end time point of the first duration, but the present disclosure will not be limited thereto. In some other embodiments of the present disclosure, the start time point $T_0$ of the first duration may be recorded with respect to the event data with the first duration. When the event data for first 200 ms is read from the event data flow as one piece of event data with the first duration, the start time point of the first duration may be marked as $T_0 = 0$. Then, the time-difference information about each event within the first duration may be calculated in accordance with the start time point and the timestamp of each event in the event data. In a possible embodiment of the present disclosure, a difference between the timestamp of each pixel within the first duration and the start time point of the first duration may be calculated to acquire the time-difference information about each event. Still taking FIG. 5 as an example, for the time-difference information about the four events, $\Delta t_1'=t_1-T_0$, $\Delta t_2'=t_2-T_0$, $\Delta t_3'=t_3-T_0$, and $\Delta t_4'=t_4-T_0$.

In this calculation method, the closer the event is to the current time point, the larger the corresponding time-difference information. At this time, the time-difference information may be directly mapped to the predetermined range using the above-mentioned pre-processing method, and the processed time-difference information may be taken as the pixel value corresponding to the event, so as to generate the image frame. Of course, the pixel value corresponding to each event may be generated in accordance with the time-difference information in any other ways, which may refer to those mentioned hereinabove and thus will not be particularly defined herein.

Figure 6:
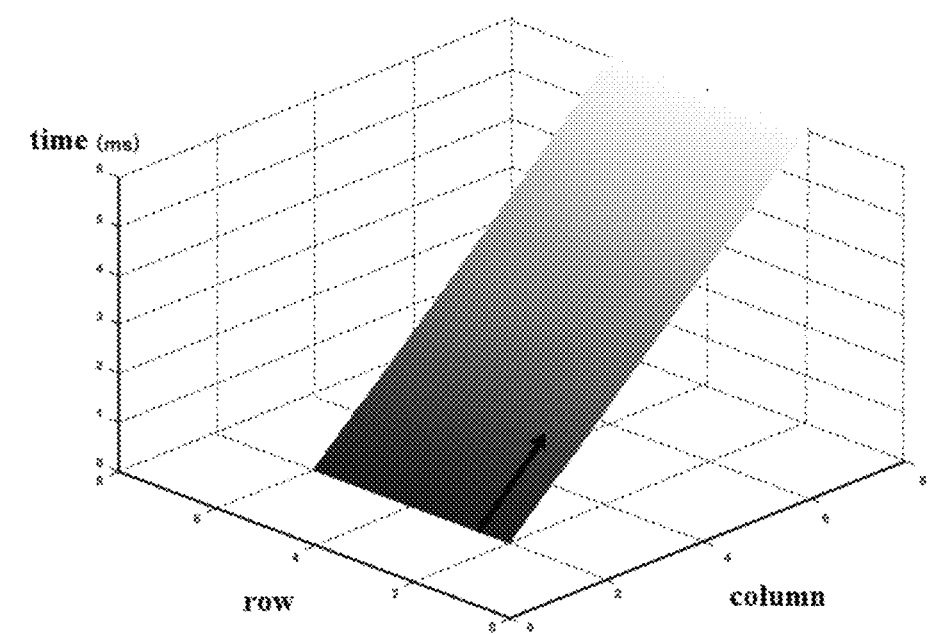
FIG. 6 is a schematic view showing image frames according to one embodiment of the present disclosure.
Figure 6:
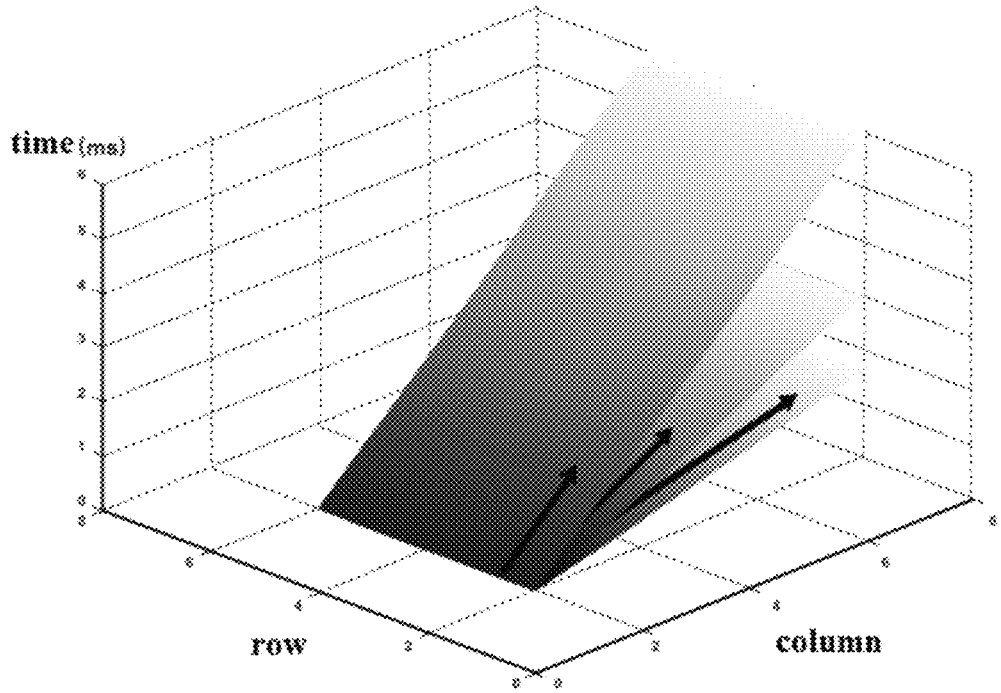
Figure 6:
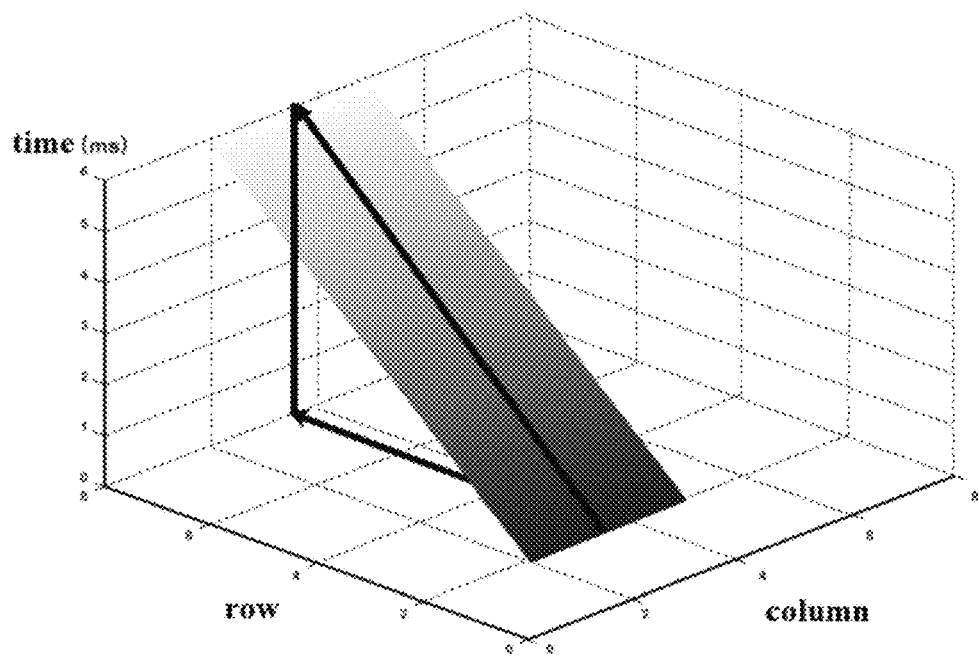
Figure 6:
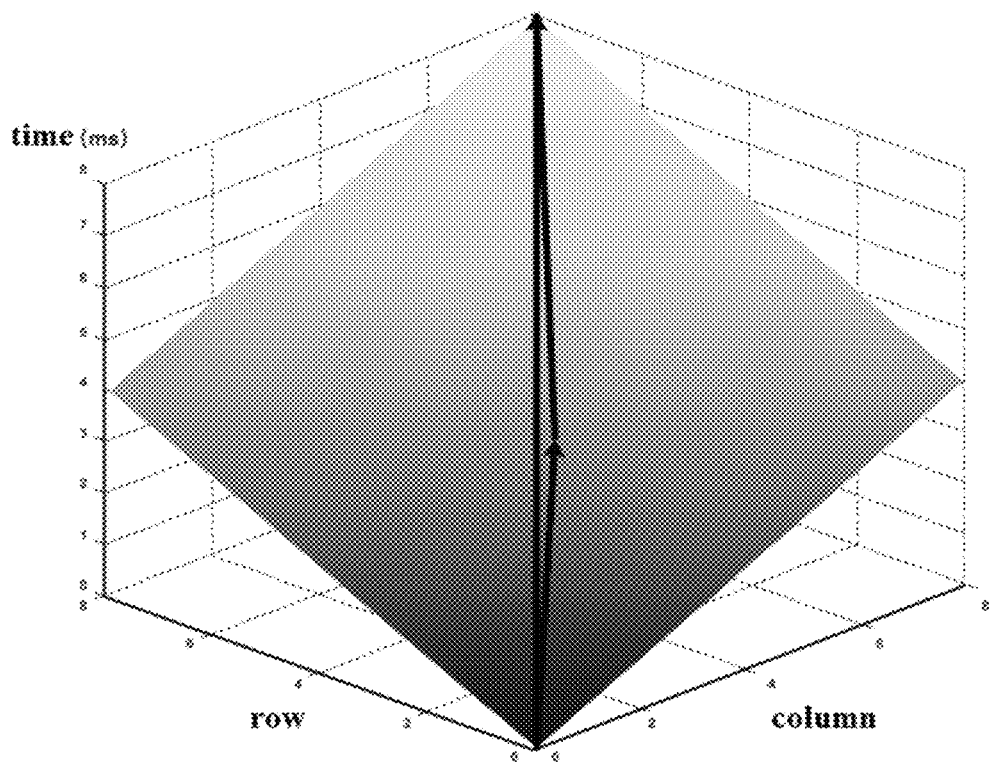

FIG. 6 shows the image frames according to one embodiment of the present disclosure. As shown in FIG. 6, each image frame generated using the method 300 for processing the event data flow (i.e., a rectangle with gradually-varied grayscales in FIG. 6) is angled to an XY plane by a certain angle, i.e., the image frame has a gradient and an aspect. In FIG. 6, (1), (2), (3) and (4) show the image frames in different movement directions. (1) and (2) show the image frames generated by the object moving in a same direction. In FIG. 6, (2) shows three image frames generated when the object moves in a same direction and at three different speeds in the scene. Due to the same movement direction, the aspects of the three image frames may be the same (a direction indicated by an arrow in FIG. 6 may be considered as the aspect). However, due to different movement speeds, the image frames are provided with different gradients. In FIG. 6, (3) and (4) show the image frames generated when the object moves in the other two directions. Identically, the aspect of the image frame is indicated by the arrow, and the gradient of the image frame is indicated by an angle between the arrows. It should be appreciated that, the image frames in FIG. 6 are for illustrative purposes only, and they are merely used to focus on the gradient of the image frame on the XY plane. In actual use, the image frames may be exhibited in various ways. As compared with the other processing modes, the gradient of the image frame generated using the method 300 may be displayed in a smoother manner, and such a smooth transition is shown in FIG. 6 through the gradually-varied grayscales in the image frame, so it is able to calculate the gradient and the aspect in a more accurate manner. The gradient and the aspect of the weighted image frame may be calculated using such an algorithm as Meanshift algorithm. For example, a slope crest (maximum value) and a slope base (minimum value) may be determined, and then a shortest path between the slope crest and the slope base may be calculated through the Meanshift algorithm. At this time, a direction pointed by the path is just the aspect, and an angle of the path relative to the XY plane is just the gradient. Usually, the movement direction of the object in the scene may be acquired in accordance with the aspect, and a relative change in the movement speed of the object may be determined in accordance with the gradient. In a word, based on the image frames, it is able to conveniently and effectively analyze the movement speed and the movement direction of the object in the scene within a certain time period, thereby to increase the optical flow calculation speed.

It should be appreciated that, one method for calculating the gradient and the aspect of the image frame has been described hereinabove, so as to analyze the movement direction and the movement speed of the object. Actually, on the basis of the image frame, the gradient and the aspect may be calculated using various algorithms so as to analyze the movement direction and the movement speed of the object moving in the scene, and these algorithms all fall within the scope of the present disclosure.

It should be appreciated that, although with a large number of details, these specific details are not necessary for the implementation of the present disclosure. In some embodiments of the present disclosure, the known method, structure or technology is not shown, so as to facilitate the understanding of the present disclosure in a better manner.

It should be further appreciated that, sometimes the features of the present disclosure are described in conjunction with a single embodiment or figure, so as to facilitate the understanding of one or more aspects of the present disclosure. However, the method in the present disclosure shall not be construed as to reflect the intention that the present disclosure asks for more features than those specified in each claims. More definitely, as reflected in the appended claims, the creative aspect lies in the features less than all the features in the above-mentioned single embodiment. Hence, each claim following a specific embodiment may be definitely incorporated into the specific embodiment, and each claim itself may serve as an individual embodiment of the present disclosure.

It should be further appreciated that, modules, units or components in the above examples may be arranged in the device described in the embodiments, or in one or more devices different from the device. The modules may be combined into one module, or each module may be divided into a plurality of submodules.

It should be further appreciated that, the modules may be modified adaptively and arranged in one or more devices different from that mentioned hereinabove. The modules, units or components may be combined into one module, unit or component, or each module, unit or component may be divided into a plurality of submodules, subunits or subcomponents. Apart from the features, processes or units conflicting with each other, all the features, processes or units involved in the specification (including the appended claims, abstract and drawings) may be combined in any form. Unless otherwise defined, each feature in the specification (including the appended claims, abstract and drawings) may be replaced with a same, equivalent or similar feature.

The followings are also provided in the embodiments of the present disclosure.

A7. The method according to A5, wherein the calculating the time-difference information about each event within the first duration in accordance with the start time point and/or the end time point and the timestamp of each event in the event data includes calculating a difference between the end time point of the first duration and the timestamp of each event, to acquire the time-difference information about each event.

A8. The method according to A5, wherein the calculating the time-difference information about each event within the first duration in accordance with the start time point and/or the end time point and the timestamp of each event in the event data includes calculating a difference between the timestamp of each pixel within the first duration and the start time point, to acquire the time-difference information about each event.

A11. The method according to A9 or A10, wherein a pixel value pixel$_i$ corresponding to an event i is calculated through the following formula $$pixel_i = \frac{1}{\Delta t_i},$$

where $\Delta t_i$ represents the processed time-difference information about the event i.

A12. The method according to A9 or A10, wherein a pixel value pixel$_i$ corresponding to an event i is calculated through the following formula pixel$_i$=A−$\Delta t_i$ where $\Delta t_i$ represents the processed time-difference information about the event i, and A is a constant.

A13. The method according to any one of A6 to A12, wherein the generating the image frame in accordance with the pixel value corresponding to each event within the first duration and the coordinate position includes: creating an image with a predetermined size and initializing the image as an initial image frame; searching a pixel coordinate position corresponding to each event within the first duration from the initial image frame; and taking a pixel value corresponding to each event within the first duration as a pixel value for the pixel coordinate position corresponding to the event in the initial image, to acquire the image frame.

In addition, it should be appreciated that, although some embodiments include some features in the other embodiments, the combination of the features in different embodiments may also fall within the scope of the present disclosure. For example, the features in the appended claims may be combined in any form.

In addition, some of the embodiments have been described as a combination of methods or method elements capable of being implemented by a processor of a computer system or any other device. Hence, the processor including necessary instructions for implementing the methods or the method elements may be used to form a device for implementing the methods or the method elements. In addition, the device is used to achieve functions of the elements.

Unless otherwise defined, such ordinal numerals as "first", "second" and "third" are merely used to differentiate different components rather than to represent any order, number or importance.

Although with the above embodiments, a person skilled in the art may obtain the other embodiments, which also fall within the scope of the present disclosure. In addition, it should be appreciated that, the words are selected in the present disclosure principally for readability and guidance, but shall not be construed as limiting the scope of the present disclosure. Obviously, a person skilled in the art may make further modifications and improvements without departing from the spirit of the present disclosure. The above description is for illustrative but not restrictive purposes, and the scope of the present disclosure shall be subject to the appended claims.

What is claimed is:

1. A method for processing an event data flow from a Dynamic Vision Sensor (DVS) for recording pixel information about a specific event, comprising:
reading a plurality of pieces of event data with a first duration sequentially from the event data flow, wherein the specific event is an event where brightness of a pixel in the DVS has changed, and the acquired event data comprises a coordinate position of each pixel whose brightness has changed within the first duration and a timestamp of each pixel whose brightness has changed;
with respect to each piece of event data with the first duration, analyzing the event data to acquire time-difference information about each event within the first duration, comprises: with respect to each piece of event data with the first duration, recording a start time point and/or an end time point of the first duration; and calculating the time-difference information about each event within the first duration in accordance with the start time point and/or the end time point, and the timestamp of each event in the event data; and
generating an image frame presenting a change in movement within the first duration in accordance with the time-difference information about each event within the first duration.

2. The method according to claim 1, wherein the reading the plurality of pieces of event data with the first duration sequentially from the event data flow comprises reading pieces of event data with the first duration sequentially, adjacent pieces of event data with the first duration overlap with each other, and overlapping part is event data with a second duration.

3. The method according to claim 2, wherein the reading the plurality of pieces of event data with the first duration sequentially from the event data flow comprises: when the brightness of one pixel within the first duration has changed for more than once, providing a plurality of timestamps corresponding to the coordinate position of the pixel in the read event data; and selecting a timestamp for the pixel whose brightness has changed recently from the plurality of timestamps as a timestamp corresponding to the coordinate position of the pixel.

4. The method according to claim 1, wherein the generating the image frame representing the change in the movement within the first duration in accordance with the time-difference information about each event within the first duration comprises: calculating a pixel value corresponding to each event in accordance with the time-difference information about the event; and generating the image frame in accordance with the pixel values corresponding to all the events within the first duration and the coordinate positions, so as to represent the change in the movement within the first duration.

5. The method according to claim 4, wherein the calculating the pixel value corresponding to each event in accordance with the time-difference information about each event further comprises performing a pre-processing operation on the time-difference information about each event to acquire processed time-difference information about each event; and calculating the pixel value corresponding to each event in accordance with the processed time-difference information about each event.

6. The method according to claim 5, wherein the pre-processing operation comprises mapping the time-difference information about each event within the first duration to a predetermined range.

7. A computing device, comprising one or more processors, a memory, and one or more programs stored in the memory and executed by the one or more processors, wherein the one or more programs comprise instructions for implementing the method according to claim 6.

8. A non-transitory computer-readable storage medium storing therein one or more programs comprising instructions, wherein the instructions are executed by a computing device so as to implement the method according to claim 6.

* * * * *